March 28, 1939.     F. M. CLARK     2,152,465
ELECTRIC CAPACITOR
Filed April 1, 1938
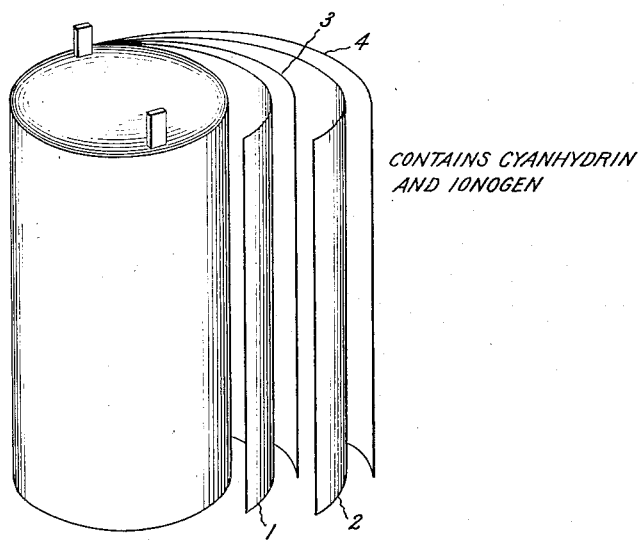
Inventor:
Frank M. Clark,
by *Harry E. Dunham*
His Attorney.

Patented Mar. 28, 1939

2,152,465

UNITED STATES PATENT OFFICE 2,152,465

ELECTRIC CAPACITOR

Frank M. Clark, Pittsfield, Mass., assignor to General Electric Company, a corporation of New York Application April 1, 1938, Serial No. 199,480

5 Claims. (Cl. 175—315)

The present invention comprises improved electrolytic capacitance devices, the new feature consisting in an improved impregnant for such capacitors.

I have discovered that markedly improved capacitor characteristics, and in particular extraordinary high capacity for a given area of capacitor elements, may be obtained by employing as the impregnating (electrolytic) element a composition consisting in part at least of an organic hydroxy nitrile, usually designated as a cyanhydrin.

Among the cyanhydrins which are suitable for use in electrolytic capacitors are ethylene cyanhydrin, ethylidine cyanhydrin, and acetone cyanhydrin. Also capable of such use are cyanhydrins derived from glycerol. Cyanhydrin compositions preferably have combined with them also one or more of the well known class of ionogens, for example, such as alkali or ammonium salts of boric or phosphoric acids, ammonium borate being preferred.

The accompanying drawing shows somewhat conventionally an electrolytic capacitor in which an electrolyte prepared in accordance with my invention may be used.

The following specific examples are illustrative of compositions embodying the present invention:

Example 1

An electrolyte composition may be prepared by dissolving an ionogen, such as ammonium tetraborate, borax, or the like, in ethylene cyanhydrin, employing preferably about 85 parts by weight of the cyanhydrin to 15 parts by weight of tetraborate crystals. The resulting solution, which is substantially neutral, is a thin, cloudy liquid at room temperature (25° C.). The resistivity at 90° C. is 150 ohms per centimeter cube, and at 25° C. is 373 ohms/cm$^3$. If the amount of ammonium tetraborate is increased to 30 per cent by weight, the resistivity at 90° C. is decreased to 98 ohms/cm$^3$, the resistivity at 25° C., however, being increased to 550 ohms/cm$^3$, When 45 per cent by weight of ammonium tetraborate is dissolved in 55 per cent by weight of the cyanhydrin, the resistivity of the resulting composition at 25° C. is 910 ohms/cm$^3$.

Example 2

It is advantageous in some cases to cause ammonium tetraborate to be formed in situ in a cyanhydrin solvent by reaction between boric acid and ammonia. For example, about 36 parts by weight of boric acid may be dissolved in 64 parts by weight of ethylene cyanhydrin. Ammonia gas is passed into this solution until a slightly alkaline reaction is obtained when it is discontinued. The resulting product at 25° C. is a thin, milky suspension having a resistivity of about 445 ohms/cm$^3$. The resistivity at 90° C. is 120 ohms/cm$^3$.

Compositions such as described above may be used with the usual electrolytic capacitor elements. As shown in the drawing, these elements consist of armatures 1 and 2, which are ordinarily constituted of aluminum foil, in combination with interposed absorbent spacers 3 and 4 which, as well known, may consist of various kinds of porous paper. Preferably a creped form of paper, such as sulphite paper, is used. Various forms of woven fabrics, including textile and glass fiber fabrics, may be used. More than one layer of paper or other spaced may be used. The armatures may be etched in order to increase the surface. An etching process may be used as described in my copending application, Serial No. 183,131, filed January 3, 1938, in accordance with which the chemical etching effect of acid solution is combined with anodic or electrolytic etching effect. In some cases the foil may be etched by the purely chemical action of an acid method, such for example as 7 per cent aqueous hydrochloric acid solution in which a small amount (about .025 per cent) of hydrofluoric acid is present.

The assembled capacitor, in which the foil and interposed spacer are coiled by winding, as shown in the drawing, is impregnated by immersion in the cyanhydrin composition, which preferably is heated to an elevated temperature. For example, impregnation may occur by immersion in such composition while it is heated to 100° C., 100 pounds pressure being applied. The impregnation should be continued for at least about three hours. When impregnation is complete, the impregnated units are removed from the bath and subjected to a curing treatment, as by being subjected to direct current at about 180 volts, the polarity of the voltage preferably being reversed at frequent intervals. The units finally are sealed in a container, as well understood.

Units containing a cyanhydrin electrolyte, as above-described, and in particular an electrolyte made up by weight of 55 per cent ethylene cyanhydrin and 45 per cent ammonium tetraborate, exhibit a capacity value of about one microfarad per 1.8 square inches of active foil area.

Capacitors made up of etched and oxidized aluminum foil, and containing as spacing material three sheets of absorbent tissue or creped sulphite paper, when impregnated with an electrolyte made up in accordance with Example 2, the impregnation and curing treatment being the same as above-described, are characterized by exceptional high capacity of one microfarad for each two square inches of foil area, an average power factor of about 9.9 per cent, these characteristics being taken at 25° C.

What I claim as new and desire to secure by Letters Patent of the United States is:

1. An electrolyte composition adapted for use in electric capacitors comprising as essential constituents a cyanhydrin and an ionogen.

2. In a capacitor a liquid electrolyte composition consisting essentially of a cyanhydrin and an ionogen.

3. A composition adapted for use in electric capacitors comprising as essential constituents ethylene cyanhydrin and an ionogen.

4. A composition adapted for use in electric capacitors comprising as essential constituents ethylene cyanhydrin and ammonium borate.

5. A composition adapted for use in electric capacitors comprising by weight about 55 to 85 per cent of a cyanhydrin and about 45 to 15 per cent of ammonium tetraborate.

FRANK M. CLARK.